3,393,099
METHOD OF PRODUCING LAYER OF COBALT OXIDE ON NICKEL SURFACE DURING FUEL CELL OPERATION

Jose D. Giner, Glastonbury, and John H. Sizer, Jr., Vernon, Conn., assignors, by mesne assignments, to Leesona Corporation, Cranston, R.I., a corporation of Massachusetts
No Drawing. Filed Sept. 30, 1965, Ser. No. 491,824
9 Claims. (Cl. 136—86)

ABSTRACT OF THE DISCLOSURE

An improved method of generating electricity directly from a fuel and oxidant in a fuel cell including an aqueous alkali metal hydroxide electrolyte, an oxidizing electrode having a porous nickel surface in contact with the electrolyte and a fuel electrode in contact with the electrolyte is described. The improvement in the method comprises the incorporation of a water soluble cobalt salt in the electrolyte of the cell in a quantity sufficient to produce a layer of cobalt oxide in situ on the nickel surface during the generation of electrical energy.

---

This invention relates to an improved fuel cell. More particularly, it relates to a fuel cell comprising a porous nickel cathode in conjunction with an aqueous alkali metal hydroxide electrolyte containing a cobalt salt.

In the prior art, nickel cathodes have been found to possess excellent properties in fuel cells, primarily from the standpoint of electrochemical activity and resistance to the corrosive environment of the electrolyte. However, after periods of extended operation, a layer of "green" nickel oxide builds up on the surface of the electrode which is completely, or substantially completely non-conductive. Concurrently with the formation of the layer of nickel oxide, the performance of the cell depreciates. To overcome this phenomenon, it has been suggested that the electrode is to be treated with lithium or cobalt prior to use in the fuel cell. The nickel-lithium and/or nickel-cobalt surface formed as a result of the treatment does retard the build up of the oxide layer and the electrode retains its activity for longer periods. In the case of cobalt, the surface also has enhanced electrochemical properties.

Although the treatment of the electrode, before being used in a fuel cell, with nickel or cobalt provides improved performance in comparison to non-treated electrodes, it has been found that dendrite formation on the electrodes occurs possibly as a result of dissolution of the nickel electrode.

Accordingly, the primary object of the present invention is to provide a fuel cell having improved stability and electrochemical performance comprising a porous nickel cathode and an electrolyte containing cobalt ions.

It is another object of the present invention to provide a fuell cell having a porous nickel cathode which has not been subjected to pre-treatment and which has a long lifetime and improved electrochemical performance.

It is another object of the present invention to provide a fuel cell having a porous nickel cathode which has been pre-oxidized using lithium or cobalt as the activator, and having improved stability in electrochemical performance, comprising an electrolyte containing cobalt ions.

These and other objects of the invention will become more readily apparent from the following detailed description with particular emphasis being placed on the working example.

The aforesaid objects are accomplished by constructing a fuel cell comprising a porous nickel cathode and an alkali metal hydroxide electrolyte which contains a cobalt salt. During the operation of the cell, a layer of $Co_2O_3$ is deposited on the nickel surface from the electrolyte solution. The deposition of the film, which is highly uniform, during the operation of the cell prevents dissolution of the nickel of the electrode proper, preserving the integrity of the pores of the electrode and reduces or eliminates dendrite formation. At the operating conditions of the cell, the cobalt in solution has an affinity for the nickel cathode and, therefore, will not migrate to, and foul the anode.

Having described the invention in general terms, the following example is set forth to more particularly illustrate the invention.

EXAMPLE

A fuel cell is constructed in a suitable housing employing a non-porous 5 mil thick, 75 percent palladium, 25 percent silver alloy anode. The cathode positioned $\frac{1}{16}$ of an inch from the anode was a bi-porous nickel electrode constructed substantially as described in Bacon, U.S. Patent No. 2,716,670, with the exception of the lithium pre-treatment. An 80 percent molten KOH electrolyte solution containing 2% by weight cobalt nitrate was added to the space separating the anode and cathode. Hydrogen and oxygen were fed to the anode and cathode, respectively, at 10 p.s.i.g. At 200° C., the cell provided a current density of 250 ma./cm.$^2$ at 0.9 volt. Furthermore, after 50 hours of continuous operation, there was no evidence of deterioration in the cell performance, nor was there evidence of pitting of the electrode or of dendrite formation.

Although the cobalt was added to the electrolyte as the nitrate salt, other salts can be employed including $CoSO_4$, $CoCl_2$, since the corresponding anions are inert under these conditions. Additionally, the amount of cobalt salt in the electrolyte is not overly critical so long as it is present in an amount sufficient to protect the cathode. Preferably, the cobalt salt will be present in 0.5% to 5.0% by weight of electrolyte.

The fuel cell of this invention can be operated with either air or oxygen as the oxidant and with hydrogen, hydrazine, or ammonia being examples of fuels. The particular fuel selected does not form a part of the instant invention, the proper selection of the fuel being within the ability of one skilled in the art. Furthermore, the cell can be operated at various temperatures ranging from about 20° C. to 650° C. However, the cell performs most satisfactorily at temperatures of from about 120 to 250° C. with the optimum operating temperature being from 200 to 250° C. At higher temperatures, it is found that the deterioration of the electrodes occurs at a much higher rate. The anode of the cell can be any of the prior art anodes and the proper selection will depend upon the operating conditions of the cell and the particular fuel employed.

As will be apparent to one skilled in the art, the illustrative example is set forth as a preferred embodiment of the invention. However, the invention is not to be construed as limited thereby. It is possible to produce other embodiments without departing from the inventive concept herein described and such embodiments, being within the ability of one skilled in the art, are to form a part of the claimed invention.

It is claimed:
1. In a method for the direct generation of electrical energy in an electrochemical cell including an aqueous alkali metal hydroxide electrolyte, a cathode having a porous nickel surface in contact with said electrolyte, and an anode in contact with said electrolyte, and providing an oxidant to said cathode, the improvement in which said electrolyte contains a water soluble cobalt salt in a quantity sufficient to produce a layer of cobalt oxide in situ on a nickel surface during generation of electrical energy.

2. In the method of claim 1 wherein the said porous nickel oxidizing electrode is bi-porous.

3. In the method of claim 1 wherein the electrolyte is potassium hydroxide.

4. In the method of claim 1 wherein the electrolyte is rubidium hydroxide.

5. In the method of claim 1 wherein the electrolyte is sodium hydroxide.

6. In the method of claim 1 wherein the electrolyte is lithium hydroxide.

7. In the method of claim 1 wherein the electrolyte is cesium hydroxide.

8. In the method of claim 1 wherein the electrolyte is a mixture of potassium hydroxide and a member of the group consisting of rubidium hydroxide and cesium hydroxide.

9. In the method of claim 1 wherein the cobalt salt is present in 0.5% to 5.0% by weight of electrolyte.

References Cited

UNITED STATES PATENTS

| | | | |
|---|---|---|---|
| 3,163,500 | 12/1964 | Grimes | 136—86 |
| 3,207,682 | 9/1965 | Oswin et al. | 136—86 X |
| 3,291,643 | 12/1966 | Oswin et al. | 136—86 |

ALLEN B. CURTIS, *Primary Examiner.*